(12) United States Patent
Maekawa

(10) Patent No.: US 8,390,716 B2
(45) Date of Patent: Mar. 5, 2013

(54) IMAGING APPARATUS HAVING A DISPLAY MONITOR

(75) Inventor: Shigeshi Maekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 12/911,568

(22) Filed: Oct. 25, 2010

(65) Prior Publication Data

US 2011/0102659 A1  May 5, 2011

(30) Foreign Application Priority Data

Oct. 29, 2009  (JP) ................................. 2009-249092

(51) Int. Cl.
*H04N 5/222* (2006.01)
(52) U.S. Cl. .................... 348/333.01; 348/376
(58) Field of Classification Search ............. 348/333.01, 348/333.06, 376
See application file for complete search history.

(56) References Cited

U.S. PATENT DOCUMENTS

| 2005/0024495 A1* | 2/2005 | Hamrelius et al. ............ 348/149 |
| 2005/0041130 A1* | 2/2005 | Yoon et al. ............... 348/333.01 |
| 2007/0229694 A1* | 10/2007 | Oshima et al. ........... 348/333.06 |
| 2008/0198255 A1 | 8/2008 | Kirihara et al. |
| 2008/0239142 A1* | 10/2008 | Suzuki .......................... 348/376 |

FOREIGN PATENT DOCUMENTS

| CN | 1494318 A | 5/2004 |
| CN | 101246298 A | 8/2008 |
| EP | 1509039 A1 | 2/2005 |
| JP | 03-265375 A | 11/1991 |
| JP | 06-022186 A | 1/1994 |
| JP | 2001-358973 A | 12/2001 |
| JP | 2005-101714 A | 4/2005 |
| JP | 2005-210677 A | 8/2005 |
| JP | 2008-205589 A | 9/2008 |

* cited by examiner

*Primary Examiner* — Gevell Selby
(74) *Attorney, Agent, or Firm* — Canon USA, Inc., I.P. Division

(57) ABSTRACT

An imaging apparatus includes a pedestal portion which is formed further forward than the handle holding portion and configured to store the display monitor with a display surface of the display monitor face thereto, a projected portion formed further forward than the pedestal portion, and a hinge member one part of which is fixed to the display monitor and the other part of which is fixed to the projected portion. The display monitor is drawn from the pedestal portion to an opposite side to the grip portion by rotating the display monitor in a first direction around a first rotating shaft of the hinge member. The display monitor is drawn from the pedestal portion to a side of the grip portion by rotating the display monitor in a second direction which is an opposite direction to the first direction around a first rotating shaft.

6 Claims, 16 Drawing Sheets

IMAGING APPARATUS HAVING A DISPLAY MONITOR

BACKGROUND OF THE INVENTION

1. Field of the Invention

The present invention relates to an imaging apparatus including a display monitor for displaying an image.

2. Description of the Related Art

Recently, an imaging apparatus such as a digital still camera and a video camera, including a display unit configured to display an image during image capture has become widespread.

Japanese Patent Application Laid-Open No. 2005-210677 discusses an imaging apparatus in which a liquid crystal display as a display unit is disposed at a leading edge of a handle provided on a video camera main body.

Recently, the display unit has been made large in size. Thus, the display unit is used in order that not only a photographer simply confirms an image which is being captured but also a staff other than the photographer confirms the image.

However, in the display unit discussed in Japanese Patent Application Laid-Open No. 2005-210677, since the display unit is opened and closed only to a left side of the imaging apparatus, there is a problem that it is difficult to confirm an image to be displayed on the display unit from a right side of the imaging apparatus.

SUMMARY OF THE INVENTION

According to an aspect of the present invention, an imaging apparatus having a display monitor for displaying an image includes a grip portion formed on a right side of the imaging apparatus, a front leg portion formed on a front side upper part of the imaging apparatus, a rear leg portion formed on a rear side upper part of the imaging apparatus, a handle holding portion configured to connect the front leg portion and the rear leg portion, a pedestal portion which is formed further forward than the handle holding portion and configured to store the display monitor with a display surface of the display monitor face thereto, a projected portion formed further forward than the pedestal portion, and a hinge member one part of which is fixed to the display monitor and the other part of which is fixed to the projected portion, wherein the display monitor is drawn from the pedestal portion to an opposite side to the grip portion by rotating the display monitor in a first direction around a first rotating shaft of the hinge member, and wherein the display monitor is drawn from the pedestal portion to a side of the grip portion by rotating the display monitor in a second direction which is an opposite direction to the first direction around a first rotating shaft.

According to an exemplary embodiment of the present invention, an image displayed on the display unit of the imaging apparatus can be confirmed from the right side of the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
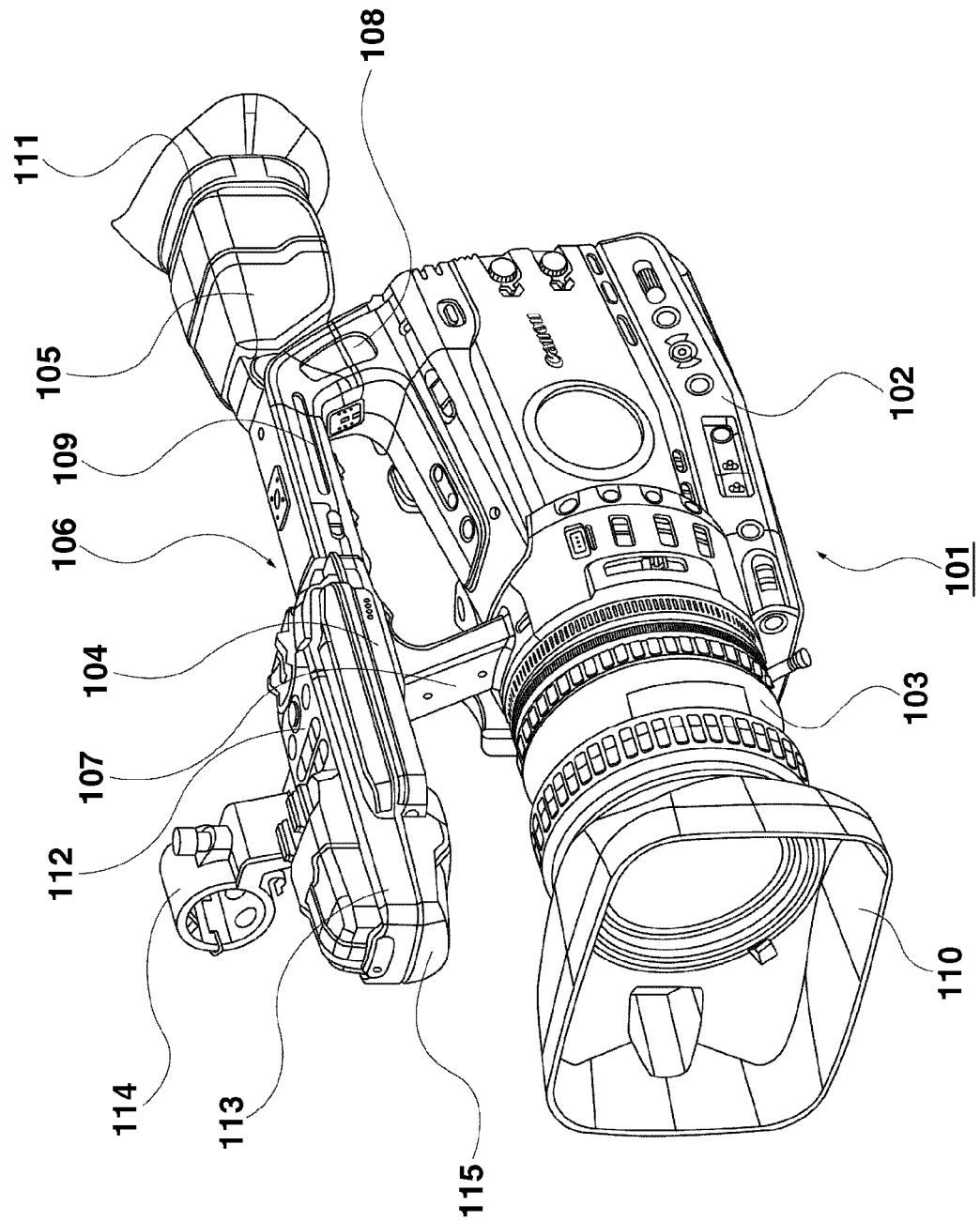
FIG. 1 illustrates a video camera with a liquid crystal display (LCD) monitor stored in a storage portion.
Figure 2:
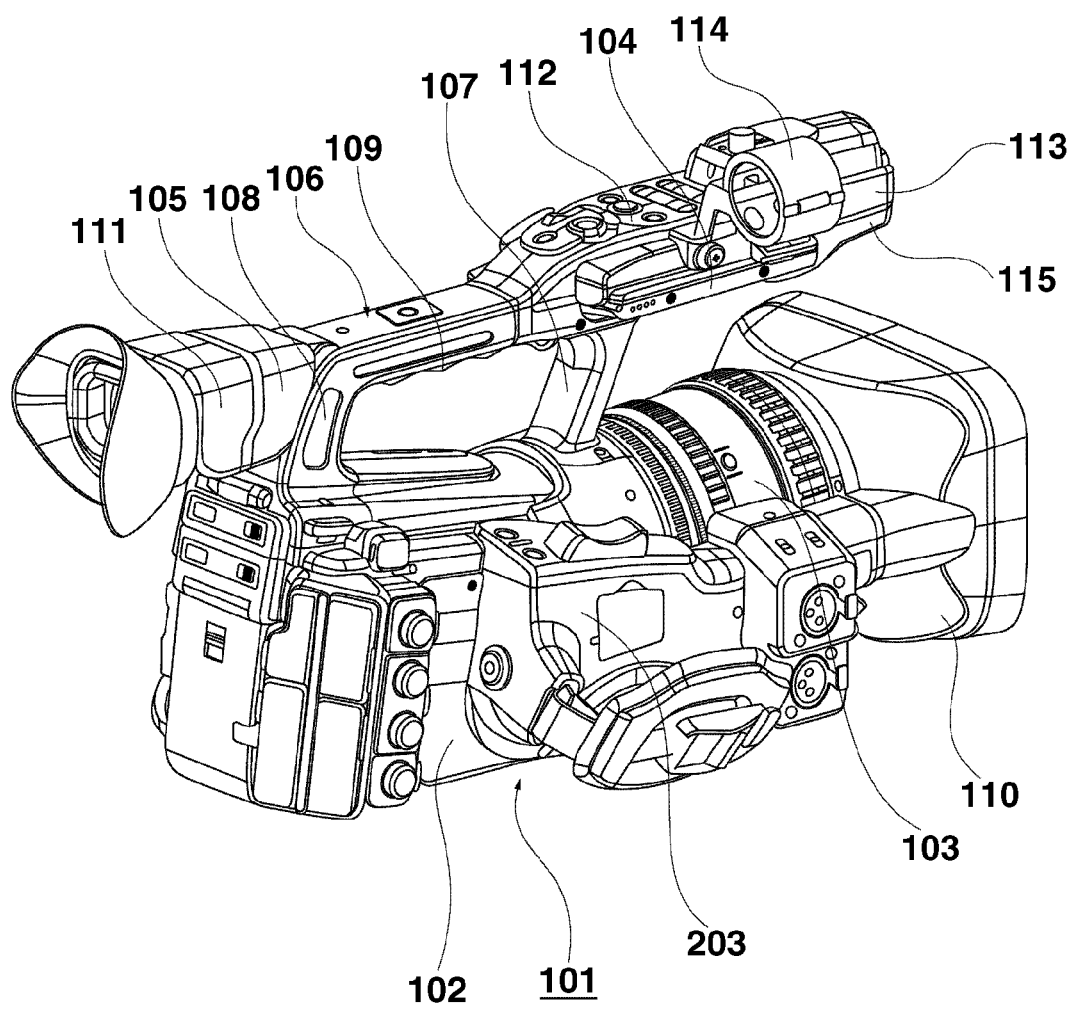
FIG. 2 illustrates a video camera with a LCD monitor stored in a storage portion.

FIGS. 1 to 16 illustrate a video camera 101 as an imaging apparatus. FIGS. 1 and 2 illustrate appearances of the video camera 101. FIGS. 3 to 6 illustrate a state in which a LCD monitor 104 serving as a display monitor is drawn to an opposite side to a grip portion 203. FIGS. 7 to 10 illustrate a state in which the LCD monitor 104 is drawn to a side of the grip portion 203.

Figure 11:
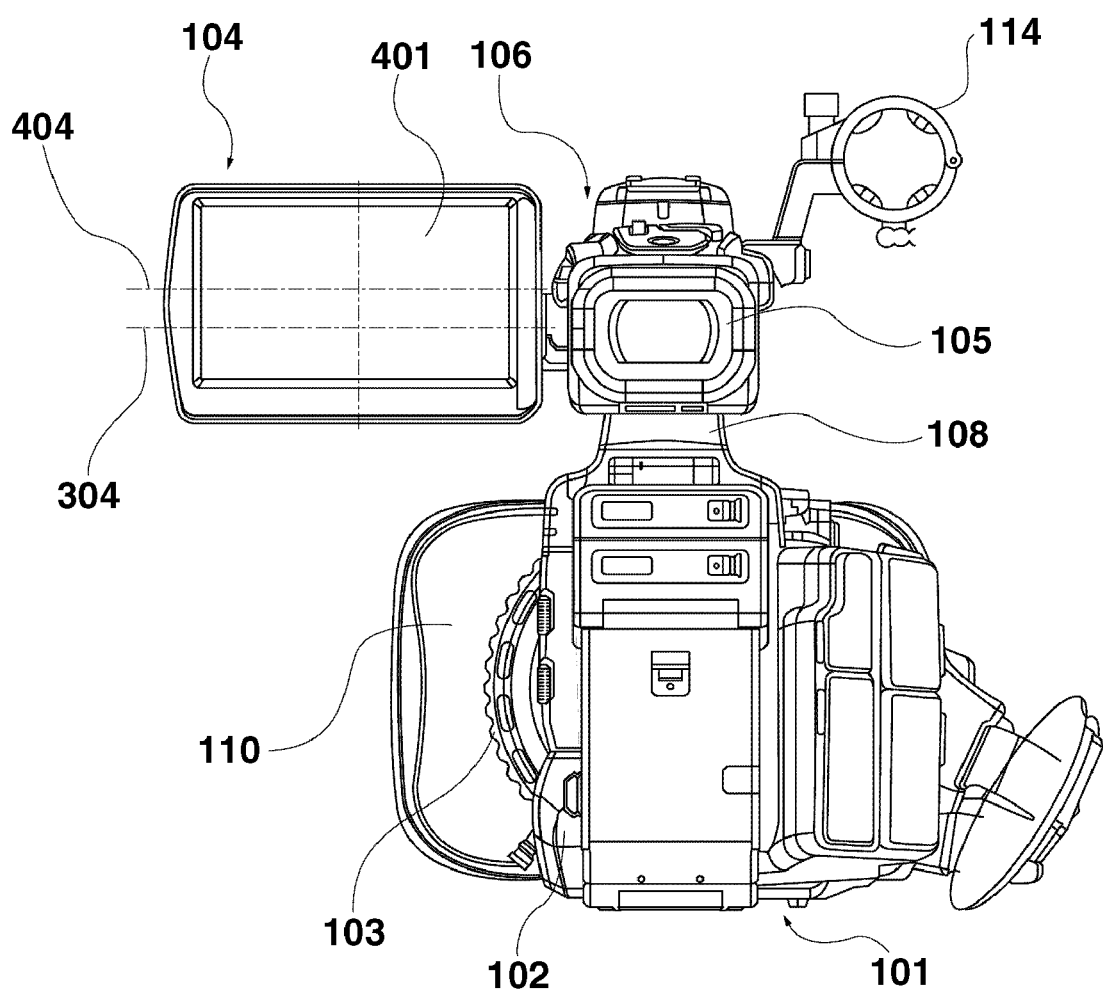
FIG. 11 illustrates a state viewed from behind the video camera in which the LCD monitor is drawn to the opposite side to the grip portion.
Figure 12:
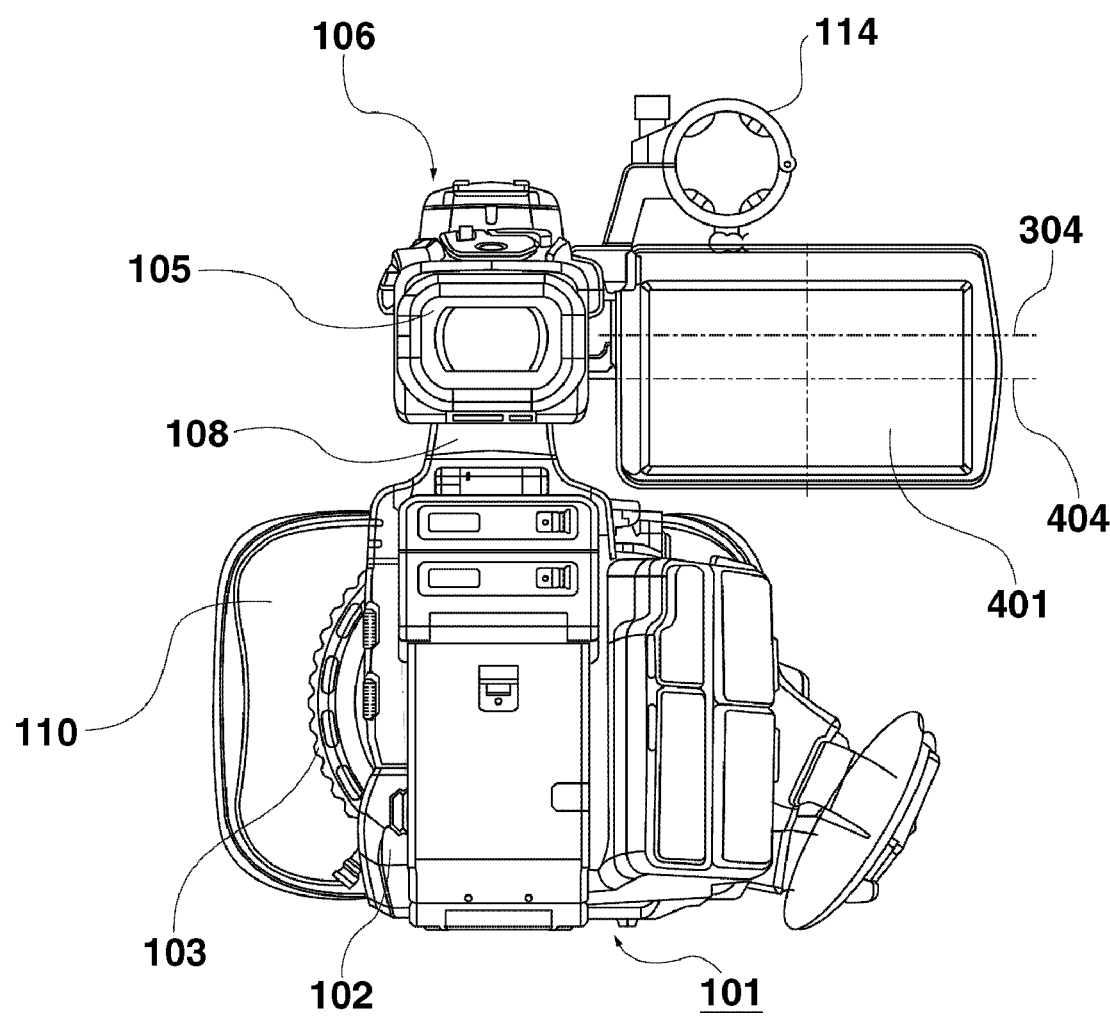
FIG. 12 illustrates a state viewed from behind the video camera in which the LCD monitor is drawn to the grip portion side.
Figure 13:
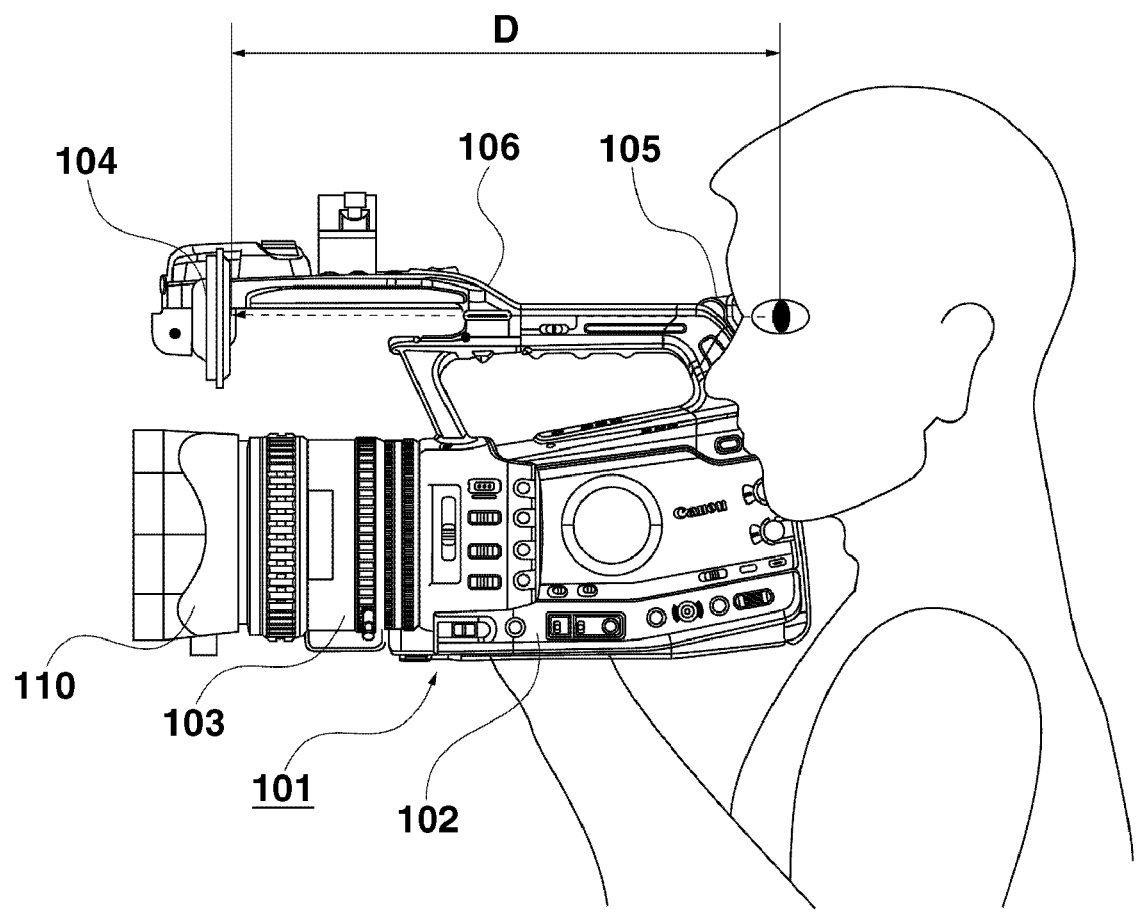
FIG. 13 illustrates a state in which the video camera is held by a person.
Figure 14:
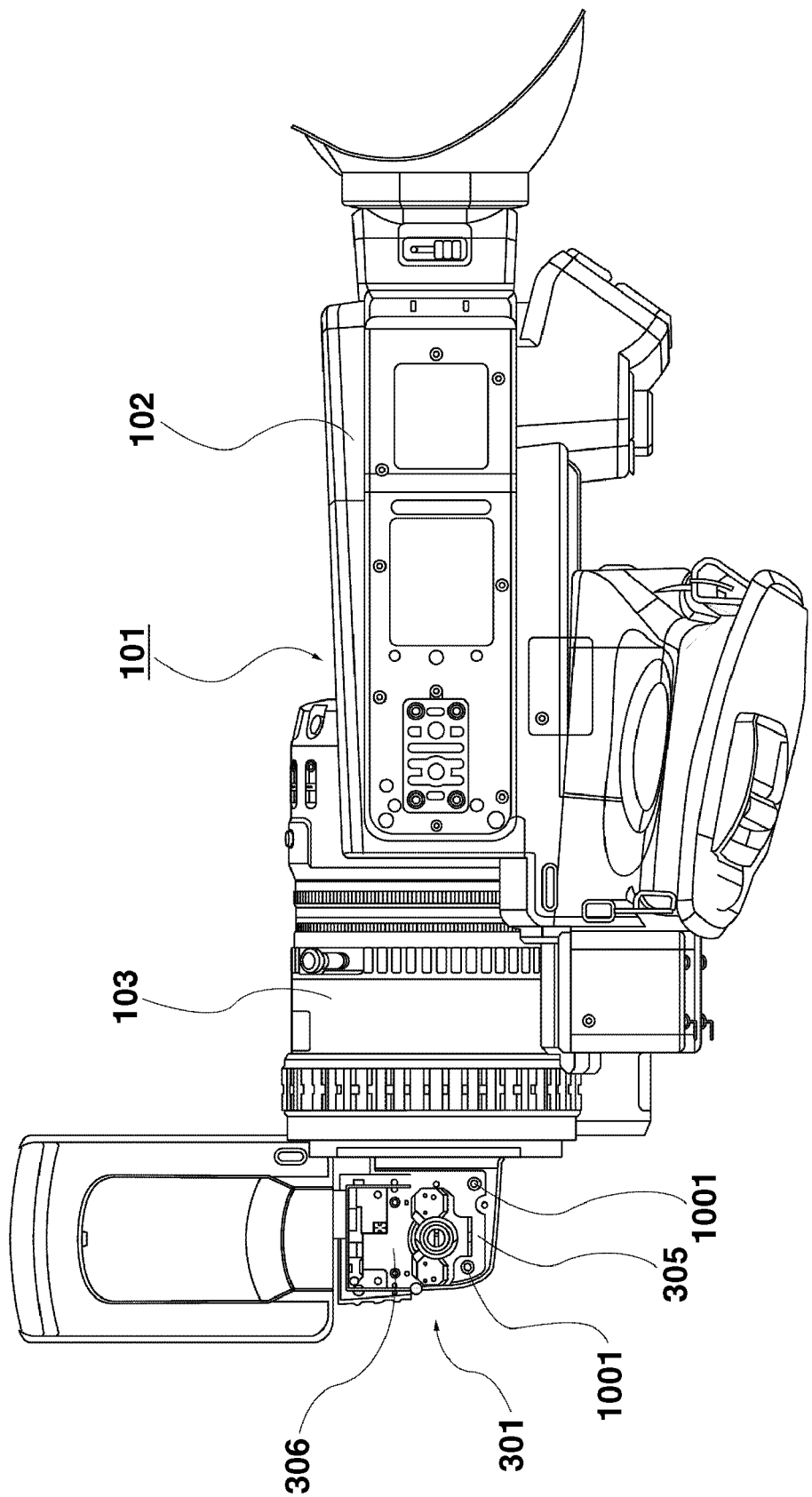
FIG. 14 illustrates an exchange operation of the LCD monitor.
Figure 15:
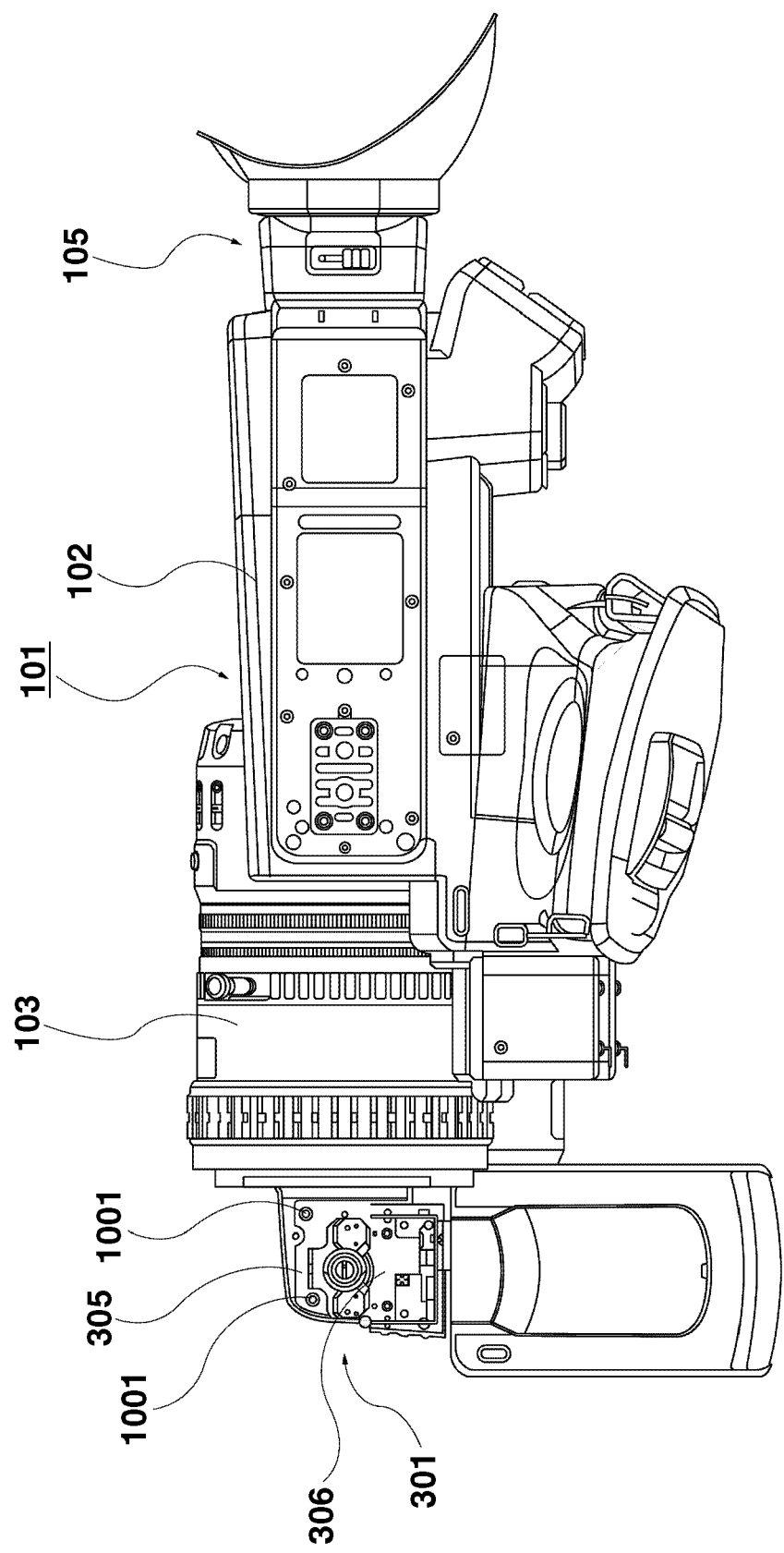
FIG. 15 illustrates an exchange operation of the LCD monitor.
Figure 16:
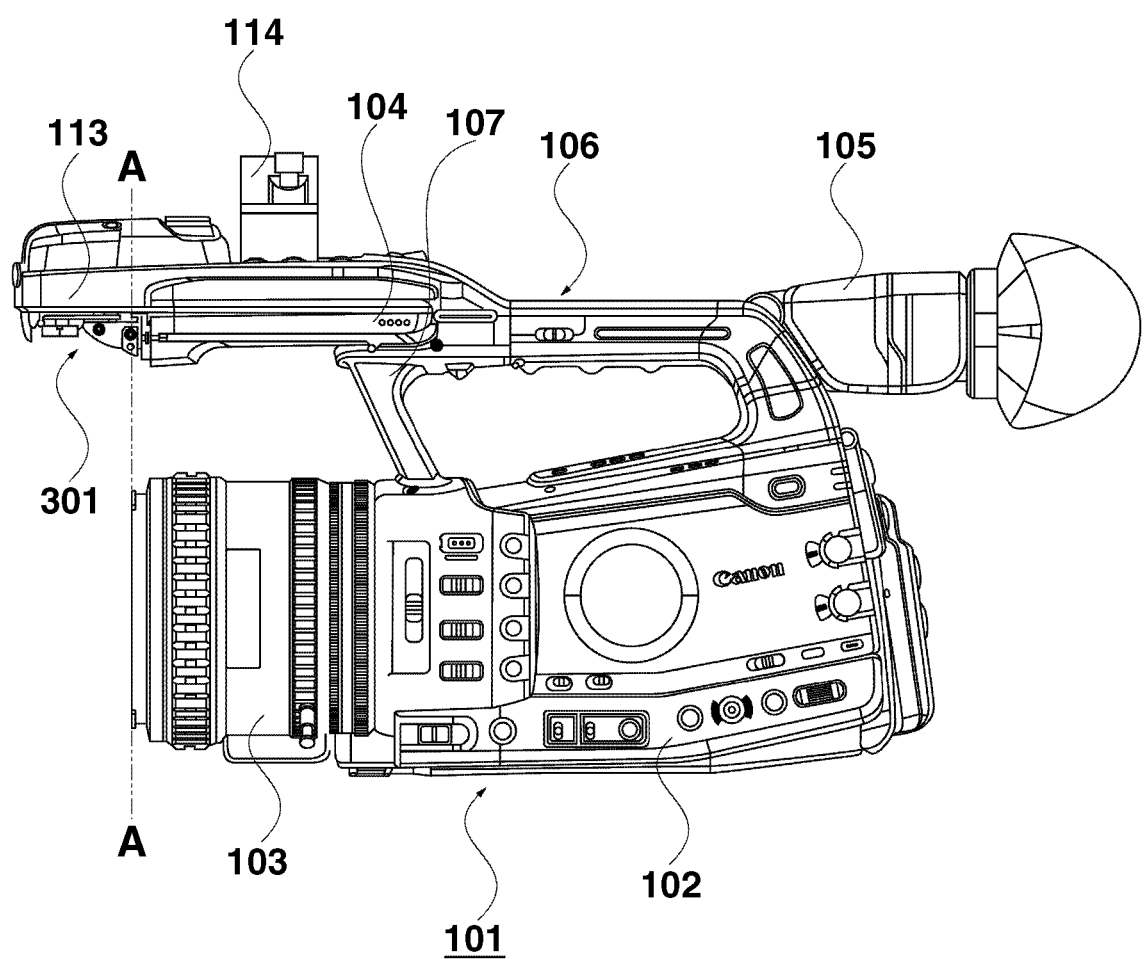
FIG. 16 illustrates an exchange operation of the LCD monitor.

FIG. 11 illustrates a state in which the LCD monitor 104 is drawn to the opposite side to the grip portion 203 that is viewed from behind the video camera 101. FIG. 12 illustrates a state in which the LCD monitor 104 is drawn to the grip portion 203 side that is viewed from behind the video camera 101. FIG. 13 illustrates a state in which the video camera 101 is held by a person. FIGS. 14 to 16 illustrate an exchange operation of the LCD monitor 104.

The video camera 101 includes a camera main body 102 and a lens unit 103 mounted so as to be projected in front of the camera main body 102. At a leading edge of the lens unit 103, a lens hood 110 for intercepting unnecessary light incident on the lens unit 103 is detachably attached.

On a right side of the camera main body 102, a grip portion 203 to be held by a photographer is integrally provided on the camera main body 102. In the grip portion 203, a grip belt is disposed. The photographer inserts his/her hand between the grip portion 203 and the grip belt to hold the grip portion 203.

On an upper part of the camera main body 102, a handle portion 106 that extends in a forward and backward direction,"

which is an optical axis direction of the lens unit 103, is integrally provided. The handle portion 106 includes a front leg portion 107 vertically provided on a front side of the upper part of the camera main body 102, a rear leg portion 108 vertically provided on a rear side of the upper part of the camera main body 102, and a handle holding portion 109 which connects the front leg portion 107 and the rear leg portion 108. On an upper part of the rear leg portion 108 and a rear end of the handle holding portion 109, an electronic view finder 105 by which the photographer can visually confirms an object is rotatably mounted. The electronic view finder 105 is mounted with an eye cup 111. The electronic view finder 105 can be rotated roughly 70 degrees upward from the states illustrated in FIGS. 1 and 2.

Further, as illustrated in FIGS. 1 and 2, in front of the handle portion 106, a pedestal portion 112 which is continuously formed in the handle holding portion 109 and a projected portion 113 which is continuously formed at the leading edge of the pedestal portion 112 are provided. On the surface of the pedestal portion 112, a plurality of operation members for operating the video camera 101 is disposed. On the back of the pedestal portion 112, a storage portion for storing the LCD monitor 104 is formed. In this state, a display surface 401 of the LCD monitor 104 faces the back of the pedestal portion 112. Thus, the display surface 401 is protected by the pedestal portion 112.

On the right side of the pedestal portion 112, an external microphone holding portion 114 to hold an external microphone such as a gun microphone is mounted.

The projected portion 113 is made of a hollow portion which is opened in front, and on the right and left sides. Inside the hollow portion, a microphone (not illustrated) is stored. On the back of the projected portion 113, a two-axis hinge 301 is mounted as a hinge member which rotatably supports the LCD monitor 104 to the handle portion 106. A hinge cover 115 covers the two-axis hinge 301.

Figure 3:
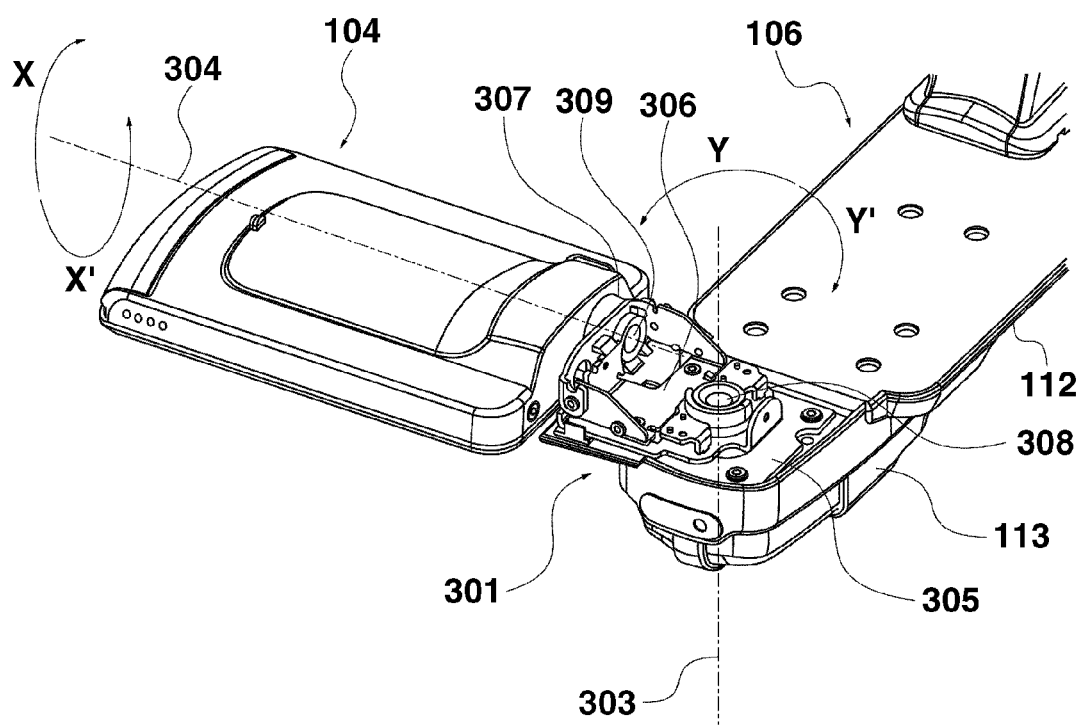
FIG. 3 illustrates a state of a two-axis hinge when the LCD monitor is drawn to an opposite side to a grip portion.

FIG. 3 illustrates a state in which the LCD monitor 104 is drawn from the storage states illustrated in FIGS. 1 and 2 to the opposite side to the grip portion 203. FIG. 3 illustrates the pedestal portion 112 and the projected portion 113 viewed from the back side thereof. Further, FIG. 3 is in a state in which the hinge cover 115 is removed and the two-axis hinge 301 is exposed.

The two-axis hinge 301 enables the LCD monitor 104 to rotate around a first rotating shaft 303. Further in a state in FIG. 3, the two-axis hinge 301 enables the LCD monitor 104 to rotate around a second rotating shaft 304. The second rotating shaft 304 is set in a position offset in parallel with a center line in a short side direction of the LCD monitor 104.

Further, in the storage state illustrated in FIGS. 1 and 2 and in the state illustrated in FIG. 3, the center line in the short side direction of the LCD monitor 104 and the first rotating shaft 303 are positioned so as to orthogonally intersect. Accordingly, the first rotating shaft 303 and the second rotating shaft 304 are not intersected to have a relationship of a twisted position. An angle to be formed between the first rotating shaft 303 and the second rotating shaft 304 becomes 90 degrees.

The two-axis hinge 301 is constituted of a fastening portion 305 to be fastened with a screw to the back of the projected portion 113, a first rotation portion 306 to be rotated relative to the fastening portion 305, and a second rotation portion 307 to be rotated relative to the first rotation portion 306.

In the fastening portion 305, a shaft portion 308 is formed. In the first rotation portion 306, a bearing portion to be inserted into the shaft portion 308 is formed. The center shaft of the shaft portion 308 serves as the first rotating shaft 303.

In the second rotation portion 307, a shaft portion 309 is formed. In the first rotation portion 306, a bearing portion to be inserted into the shaft portion 309 is formed. The center shaft of the shaft portion 309 serves as the second rotating shaft 304.

More specifically, the first rotation portion 306 is rotated around the first rotating shaft 303 relative to the fastening portion 305 and the second rotation portion 307 is rotated around the second rotating shaft 304 relative to the first rotation portion 306. The second rotation portion 307 is fastened with a screw to a monitor case 403 of the LCD monitor 104. Accordingly, one end of the two-axis hinge 301 is secured to the LCD monitor 104 and the other end of the two-axis hinge 301 is secured to the projected portion 113.

The first rotation portion 306 is configured so as to be rotated up to about 90 degrees in a direction of an arrow Y that is a first direction relative to the fastening portion 305 and also to be rotated up to about 90 degrees in a direction of an arrow Y' that is a second direction which is an opposite direction to the first direction. More specifically, the first rotation portion 306 can be rotated in a range of about 180 degrees relative to the fastening portion 305. FIG. 3 illustrates a state in which the LCD monitor 104 is rotated about 90 degrees from the states illustrated in FIGS. 1 and 2 in a direction of the arrow Y in FIG. 3, and is drawn from the pedestal portion 112 to the opposite side to the grip portion 203.

The second rotation portion 307 is configured so as to be rotated up to about 90 degrees from the state in FIG. 3 in a direction of an arrow X relative to the first rotation portion 306 and also to be rotated up to about 180 degrees in a direction of an arrow X'. More specifically, the second rotation portion 307 can be rotated in a range of about 270 degrees relative to the first rotation portion 306.

Figure 4:
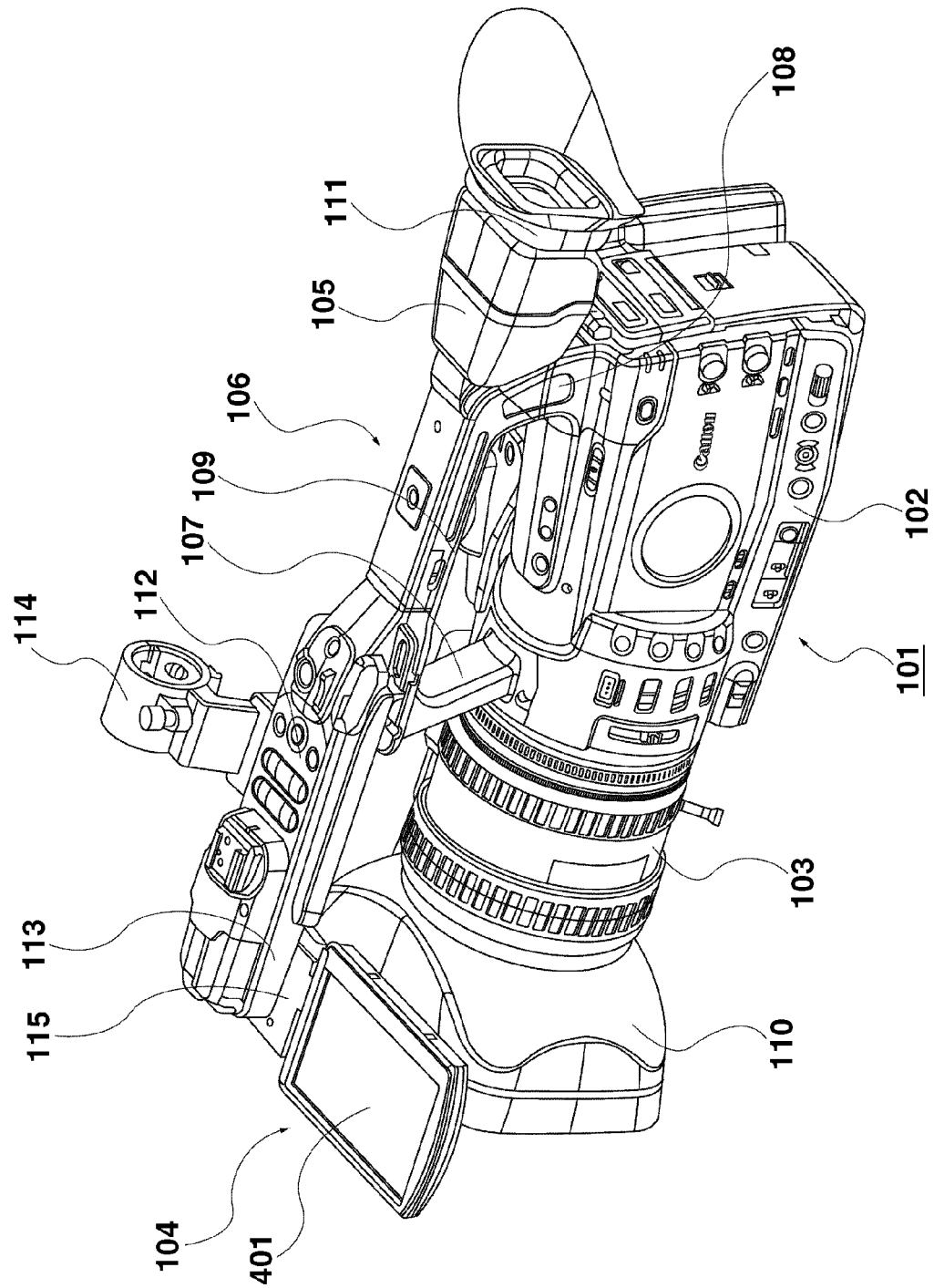
FIG. 4 illustrates a state in which the LCD monitor is drawn to the opposite side to the grip portion.

Similarly to FIG. 3, FIG. 4 illustrates a state in which the LCD monitor 104 is drawn from the storage states illustrated in FIGS. 1 and 2 to the opposite side to the grip portion 203. At this time, inside the two-axis hinge 301, the first rotation portion 306 is rotated about 90 degrees in the direction of the arrow Y in FIG. 3 relative to the fastening portion 305. Accordingly, as illustrated in FIG. 4, the video camera 101 is changed into a state in which the display surface 401 of the LCD monitor 104 faces upward and is exposed from the pedestal portion 112. In this state, in low angle shooting, an object can be confirmed by the LCD monitor 104 on the opposite side to the grip portion 203. FIG. 4 is in a state in which the hinge cover 115 is attached.

The LCD monitor 104 is rotated from the state in FIG. 4 around the second rotating shaft 304 so as to turn the display surface 401 to face rearward of the video camera 101. Thus, the video camera 101 is changed into a state illustrated in FIG. 5. At this time, inside the two-axis hinge 301, the second rotation portion 307 is rotated about 90 degrees from the state illustrated in FIG. 3 in the direction of the arrow X' in FIG. 3 relative to the first rotation portion 306.

Figure 5:
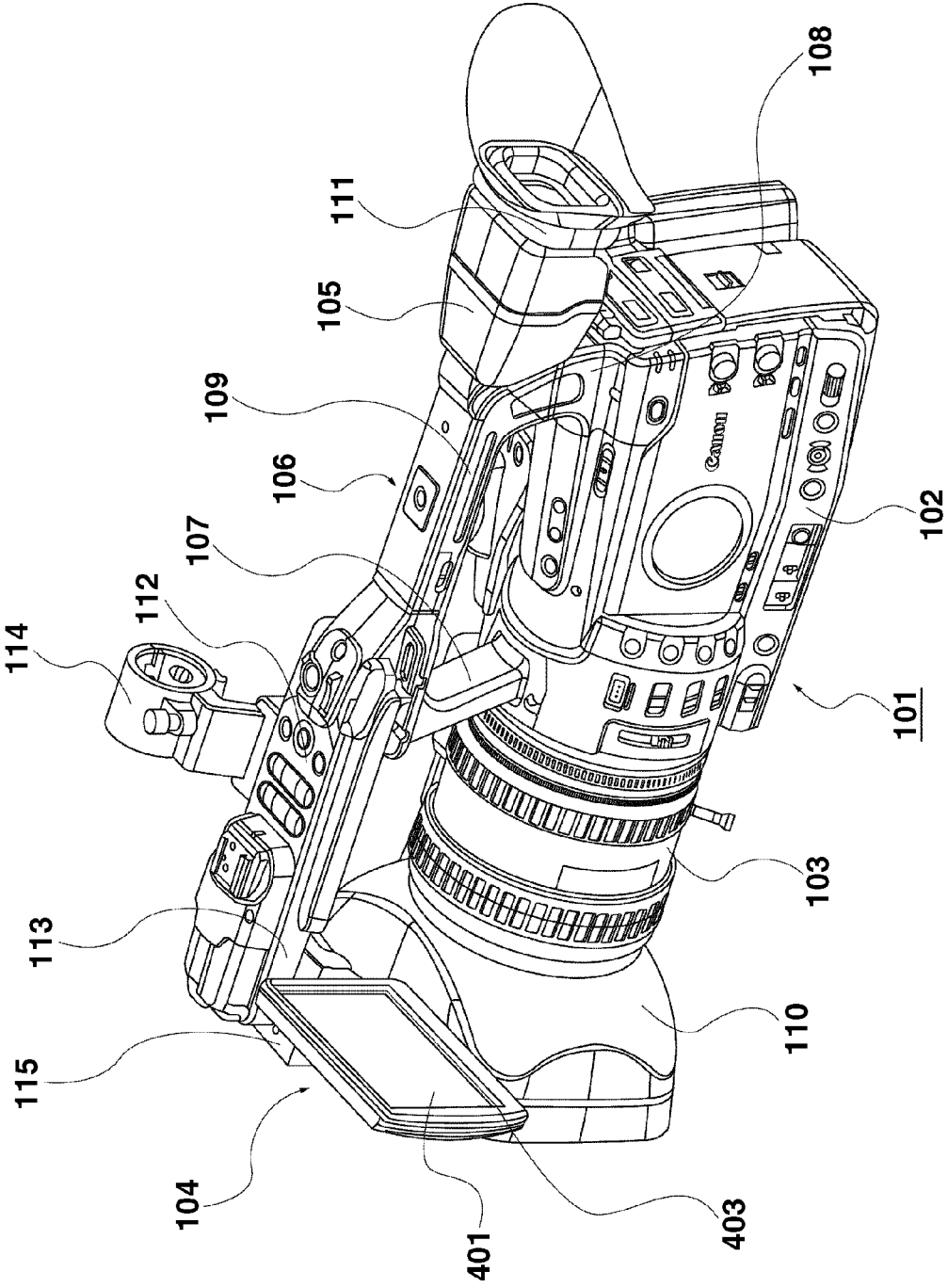
FIG. 5 illustrates a state in which the LCD monitor is drawn to the opposite side to the grip portion.

Further, the display surface 401 of the LCD monitor 104 can further be rotated downward up to 90 degrees from the state illustrated in FIG. 5 around the second rotating shaft 304. In the state in which the LCD monitor 104 is drawn to the opposite side to the grip portion 203, by rotating the LCD monitor 104 around the second rotating shaft 304, the display surface 401 of the LCD monitor 104 passes through the state illustrated in FIG. 5 to face downward to the video camera 101. Accordingly, even in high angle shooting, an object can be confirmed by the LCD monitor 104.

Further, the LCD monitor 104 is rotated around the second rotating shaft 304 so that the display surface 401 faces forward of the video camera 101 from the state in FIG. 4. Thus, the video camera 101 is changed into the state illustrated in FIG. 6. At this time, inside the two-axis hinge 301, the second rotation portion 307 is rotated about 90 degrees from the state illustrated in FIG. 3 in the direction of the arrow X in FIG. 3 relative to the first rotation portion 306.

Figure 7:
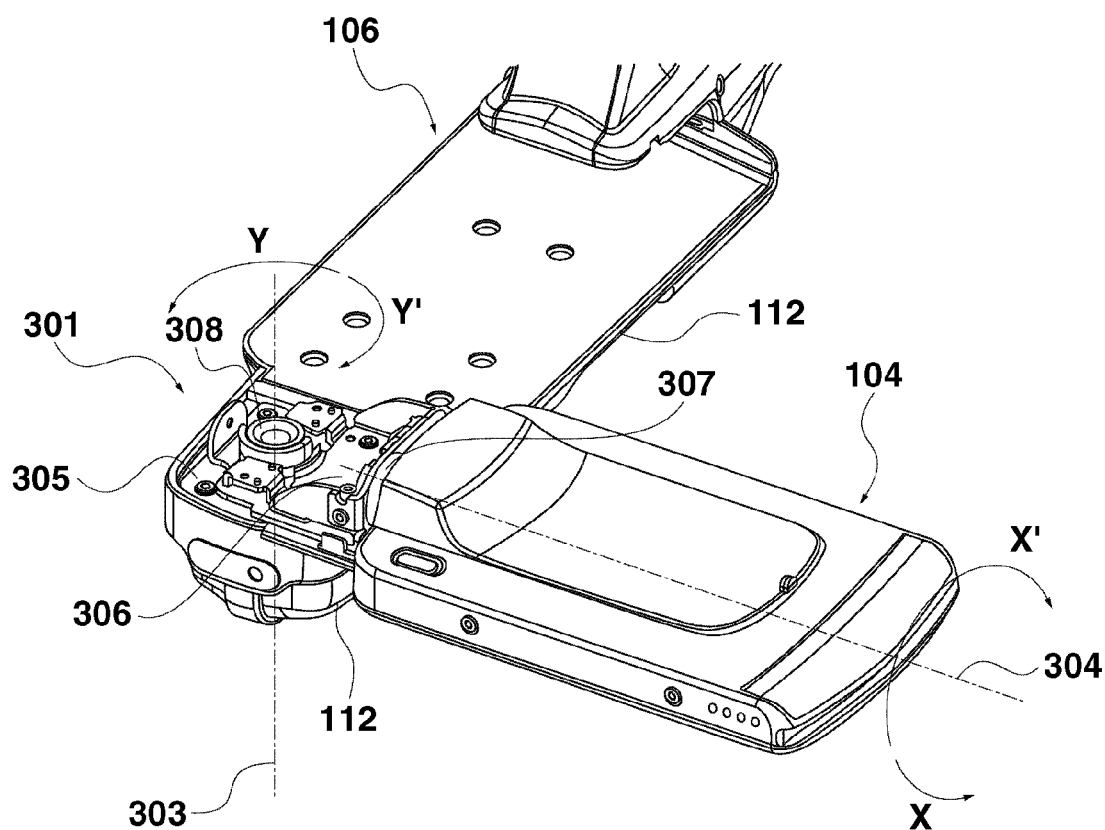
FIG. 7 illustrates a state of a two-axis hinge when the LCD monitor is drawn to a grip portion side.

FIG. 7 illustrates a state in which the LCD monitor 104 is drawn from the storage states illustrated in FIGS. 1 and 2 to the grip portion 203 side. Similarly to FIG. 3, FIG. 7 also illustrates the pedestal portion 112 and the projected portion 113 viewed from the back side thereof. FIG. 7 is in a state in which the hinge cover 115 is removed and the two-axis hinge 301 is exposed. FIG. 7 is in a state in which the LCD monitor 104 is rotated about 90 degrees from the states illustrated in FIGS. 1 and 2 in a direction of an arrow Y', and drawn from the pedestal portion 112 to the opposite side to the grip portion 203.

The second rotation portion 307 is configured so as to be rotated up to about 180 degrees from the state in FIG. 7 in a direction of an arrow X' relative to the first rotation portion 306 and also up to about 90 degrees in a direction of an arrow X. More specifically, the second rotation portion 307 can be rotated in a range of about 270 degrees relative to the first rotation portion 306.

Figure 8:
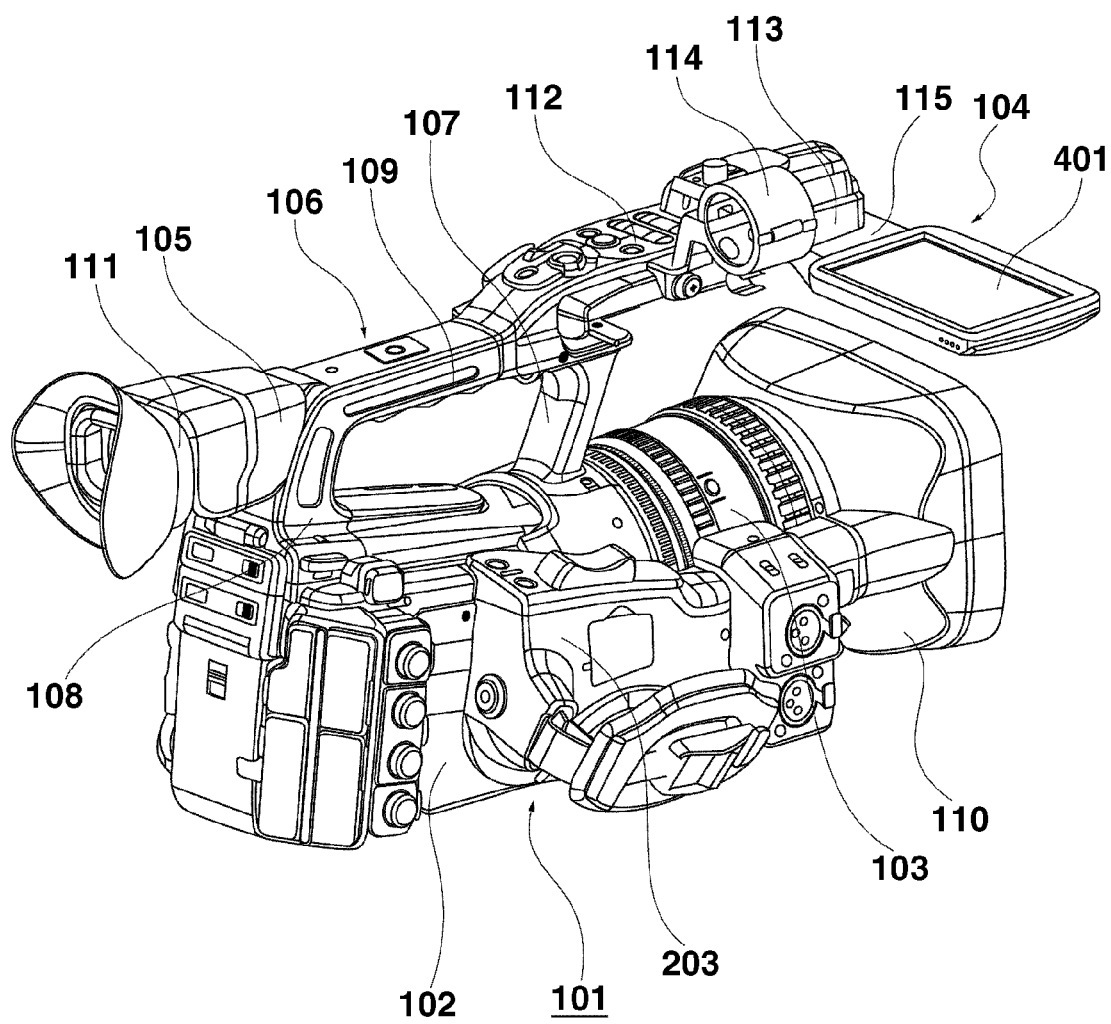
FIG. 8 illustrates a state in which the LCD monitor is drawn to the grip portion side.

FIG. 8 illustrates a state in which the LCD monitor 104 is drawn from the storage states illustrated in FIGS. 1 and 2 to the grip portion 203 side. At this time, inside the two-axis hinge 301, the first rotation portion 306 is rotated about 90 degrees in the direction of the arrow Y' in FIG. 7 relative to the fastening portion 305. Accordingly, as illustrated in FIG. 8, the video camera 101 is changed into a state in which the display surface 401 of the LCD monitor 104 faces upward and is exposed from the pedestal portion 112. In this state, in low angle shooting, an object can be confirmed by the LCD monitor 104 on the grip portion 203 side.

The LCD monitor 104 is rotated from the state in FIG. 8 around the second rotating shaft 304 so as to turn the display surface 401 to face rearward of the video camera 101. Thus, the video camera 101 is changed into a state illustrated in FIG. 9. At this time, inside the two-axis hinge 301, the second rotation portion 307 is rotated about 90 degrees from the state illustrated in FIG. 7 in the direction of the arrow X in FIG. 7 relative to the first rotation portion 306.

Figure 9:
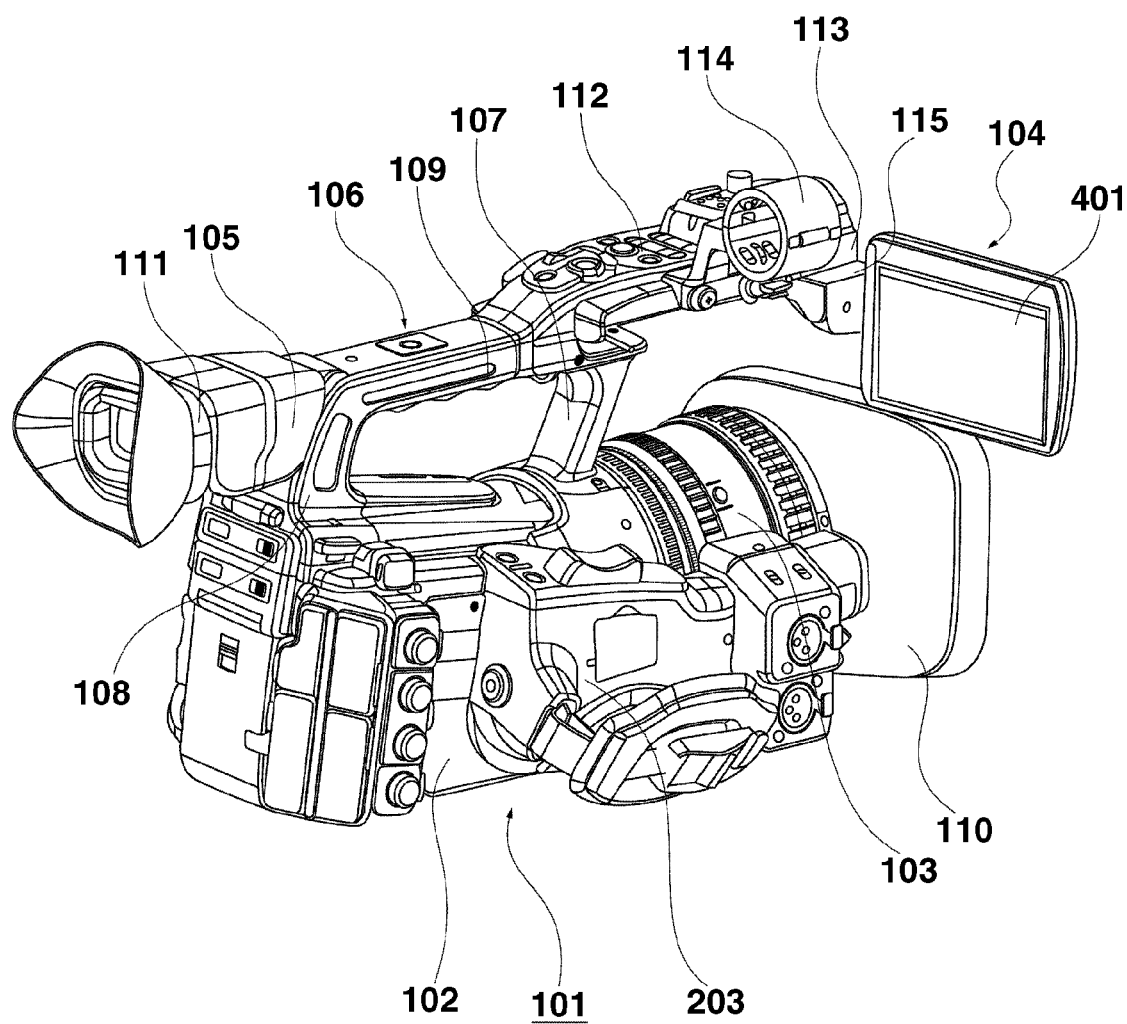
FIG. 9 illustrates a state in which the LCD monitor is drawn to the grip portion side.

When the LCD monitor 104 is changed into the state in FIG. 9, the second rotating shaft 304 is located in a position offset from the center position of the LCD monitor 104 so as not to block the display surface 401 by the external microphone holding portion 114. Accordingly, the position of the LCD monitor 104 in a height direction in the state in FIG. 9 is made lower than the position of the LCD monitor 104 in a height direction in the state in FIG. 5.

FIG. 11 illustrates the video camera 101 viewed from behind when the LCD monitor 104 is in the state in FIG. 5. FIG. 12 illustrates the video camera 101 viewed from behind when the LCD monitor 104 is in the state in FIG. 9. In FIGS. 11 and 12, a line 404 indicates the center line of the LCD monitor 104.

As illustrated in FIG. 11, in the state in FIG. 5, the center line 404 is positioned above the second rotating shaft 304. Thus, the LCD monitor 104 is positioned so as not to interfere with the operation of an operation ring provided for the lens unit 103. On the other hand, as illustrated in FIG. 12, in the state in FIG. 9, the center line 404 is positioned below the second rotating shaft 304. Thus, the display surface 401 is positioned below the external microphone holding portion 114. Accordingly, in the state in FIG. 5, the LCD monitor 104 does not interfere with the operation of the operation ring. Further, in the state in FIG. 9, the external microphone holding portion 114 does not interfere with confirmation of an image displayed on the LCD monitor 104.

Further, the LCD monitor 104 is rotated around the second rotating shaft 304 from the state in FIG. 8 such that the display surface 401 faces forward of the video camera 101. Thus, the video camera 101 is changed into the state illustrated in FIG. 10. At this time, inside the two-axis hinge 301, the second rotation portion 307 is rotated about 90 degrees from the state illustrated in FIG. 7 in the direction of the arrow X' in FIG. 7 relative to the first rotation portion 306. The second rotating shaft 304 is offset from the center position of the LCD monitor 104. Thus, in the state in FIG. 10, the LCD monitor 104 is positioned so as to overlap with the external microphone holding portion 114. However, since the external microphone holding portion 114 is positioned behind the LCD monitor 104, when the display surface 401 faces forward, the microphone holding portion 114 does not block the display surface 401.

Figure 10:
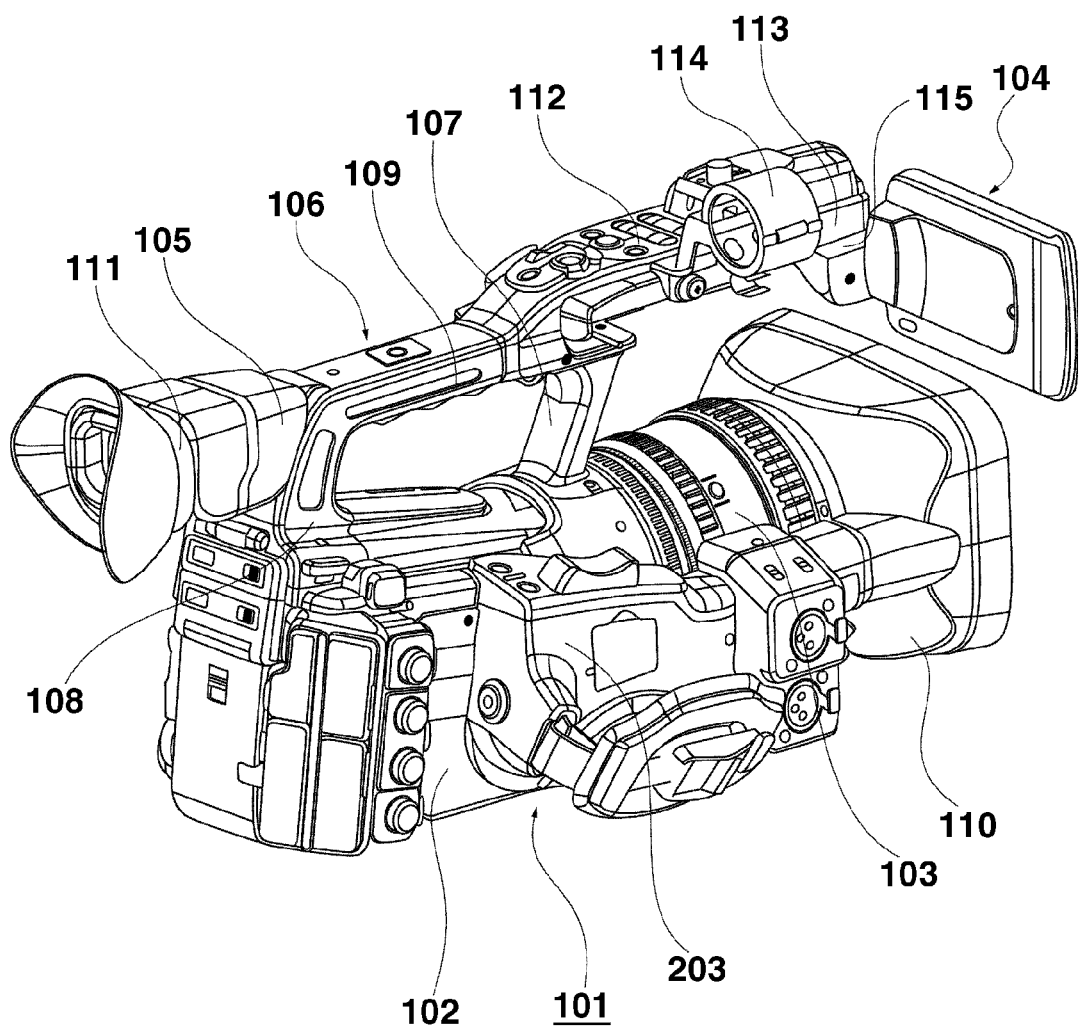
FIG. 10 illustrates a state in which the LCD monitor is drawn to the grip portion side.

The display surface 401 of the LCD monitor 104 can further be rotated downward up to 90 degrees from the state in FIG. 10 around the second rotating shaft 304. When the LCD monitor 104 is drawn to the grip portion 203 side, by rotating the LCD monitor 104 around the second rotating shaft 304, the display surface 401 of the LCD monitor 104 passes through the state illustrated in FIG. 10 and faces downward of the video camera 101. Accordingly, even in high angle shooting in a facing state, an object can be confirmed by the LCD monitor 104.

As described above, in the video camera 101 according to the present exemplary embodiment, the first rotation portion 306 is rotated about 90 degrees in the direction of the arrow Y and in the direction of the arrow Y' relative to the fastening portion 305. Thus, the LCD monitor 104 can be drawn from the storage states illustrated in FIGS. 1 and 2 to the side of the grip portion 203 and the opposite side to the grip portion 203.

Figure 6:
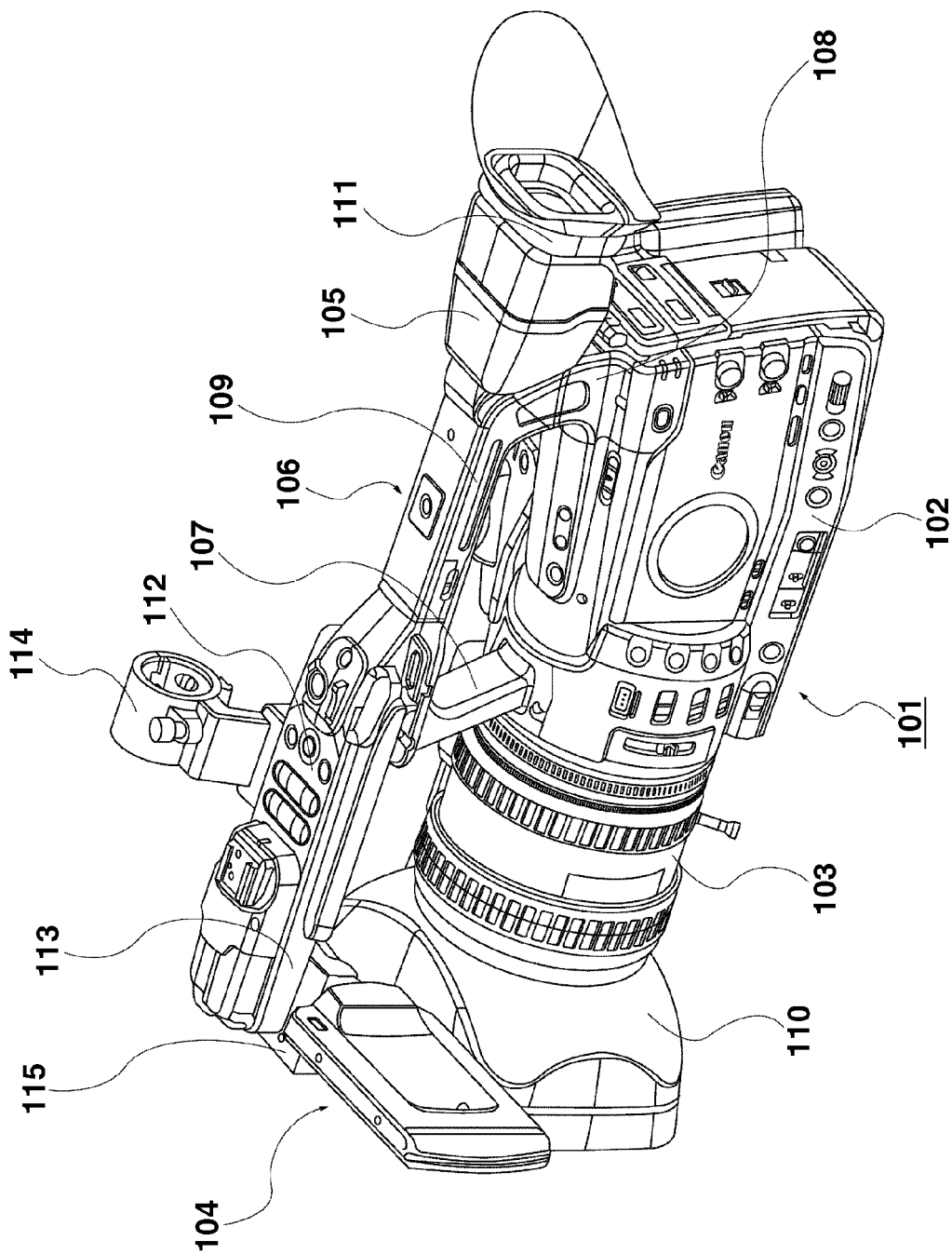
FIG. 6 illustrates a state in which the LCD monitor is drawn to the opposite side to the grip portion.

Accordingly, when a captured image is monitored from the opposite side to the grip portion 203, the video camera 101 may be changed into the state illustrated in FIG. 5 or FIG. 6. When the captured image is monitored from the side of the grip portion 203, the video camera 101 may be changed into the state illustrated in FIG. 9 or FIG. 10.

Further, the display surface 401 of the LCD monitor 104 can further be rotated downward up to 90 degrees from the state illustrated in FIG. 5 around the second rotating shaft 304. Furthermore, the display surface 401 of the LCD monitor 104 can further be rotated downward up to 90 degrees from the state illustrated in FIG. 10 around the second rotating shaft 304.

Accordingly, the direction of the display surface 401 of the LCD monitor 104 can variously be changed corresponding to a shooting situation.

FIG. 13 illustrates a state in which a photographer holds the video camera 101 which is in the state illustrated in FIG. 5. This type of video camera is larger and heavier than a household video camera. Thus, in order to securely hold the camera, as illustrated in FIG. 13, the photographer holds the video camera with an arm squeezed and an elbow bent.

In FIG. 13, the photographer's eye is separated from the display surface 401 of the LCD monitor 104 at a distance D. In the video camera 101 according to the present exemplary embodiment, the two-axis hinge 301 is disposed on the back of the projected portion 113 positioned on the leading edge of the handle portion 106. Thus, when the display surface 401 of the LCD monitor 104 is turned backward, the distance D can be made long. Accordingly, even when the video camera 101 is held as illustrated in FIG. 13, the display surface 401 of the LCD monitor 104 can be placed as far as possible from the eye of the photographer.

Next, an exchange operation of the LCD monitor 104 will be described.

FIGS. 14 and 15 illustrate the video camera 101, from which the lens hood 110 and the hinge cover 115 are removed, viewed from the bottom. FIG. 16 illustrates the video camera 101, from which the lens hood 110 and the hinge cover 115 are removed, viewed from the side. The hinge cover 115 is secured with a screw, so that the hinge cover 115 can be removed from the video camera 101 by removing the screw.

As illustrated in FIGS. 14 to 16, the fastening portion 305 of the two-axis hinge 301 is disposed to be projected from the leading edge of the lens unit 103. By unfastening a screw 1001 by which the fastening portion 305 is fastened on the back of the projected portion 113, the LCD monitor 104 can be removed from the video camera 101 together with the two-axis hinge 301. Further, into the two-axis hinge 301, wiring for executing electric connection and a connection component (not illustrated) such as a flexible board are inserted. These components can be separated from the video camera 101 by removing a connector.

As illustrated in FIG. 16, a position where the two-axis hinge 301 is fastened on the back of the projected portion 113 is projected more forward than a position at the leading edge of the lens unit 103 which is indicated by a line A-A. Thus, the screw 1001 with which the fastening portion 305 is fastened can simply be unfastened by a tool such as a driver. Further, a large space is secured below the two-axis hinge 301. Thus, the operation of attachment and detachment of a connector can also be performed simply and securely.

As described above, according to the exemplary embodiment of the present invention, the two-axis hinge 301 of the LCD monitor 104 is disposed forward in the handle portion 106 disposed at the upper part of the camera main body 102. Thus, when the display surface 401 of the LCD monitor 104 is turned backward, the display surface 401 can be placed away from the rear end of the video camera 101. Accordingly, even if a photographer holds the video camera 101 with the video camera 101 close to his/her face, a distance between the eyes of the photographer and the display surface 401 can be secured. Thus, an object can be easily confirmed.

Further, it is configured that the LCD monitor 104 can be rotated not only to the side of the grip portion of the video camera 101 (right side of the imaging apparatus) but also to the opposite side to the grip portion (left side of the imaging apparatus). Accordingly, the photographer can visually confirm the display surface 401 of the LCD monitor 104 with various shooting postures.

Furthermore, the projected portion 113 of the handle portion 106 to which the two-axis hinge 301 is fixed is located in a position projected farther than the leading edge of the lens unit 103 from which the lens hood 110 is removed. Thus, when a screw that fastens the fastening portion 305 of the two-axis hinge 301 and the projected portion 113 is unfastened, a sufficient space can be secured below the two-axis hinge 301 and the lens unit 103 does not obstruct the operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-249092 filed Oct. 29, 2009, which is hereby incorporated by reference herein in its entirety.

What is claimed is:

1. An imaging apparatus including a display monitor for displaying an image, the imaging apparatus comprising:
    a grip portion formed on a right side of the imaging apparatus;
    a front leg portion formed on a front side upper part of the imaging apparatus;
    a rear leg portion formed on a rear side upper part of the imaging apparatus;
    a handle holding portion configured to connect the front leg portion and the rear leg portion;
    a pedestal portion which is formed further forward than the handle holding portion and configured to store the display monitor with a display surface of the display monitor face thereto;
    a projected portion formed further forward than the pedestal portion; and
    a hinge member one part of which is fixed to the display monitor and the other part of which is fixed to the projected portion,
    wherein the display monitor is drawn from a first state that the display monitor is stored in the pedestal portion to a second state that the display monitor is in an opposite side to the grip portion by rotating the display monitor in a first direction around a first rotating shaft of the hinge member, and
    wherein the display monitor is drawn from the first state that the display monitor is stored in the pedestal portion to a third state that the display monitor is in a side of the grip portion by rotating the display monitor in a second direction which is an opposite direction to the first direction around a first rotating shaft.

2. The imaging apparatus according to claim 1, further comprising a lens unit, wherein the hinge member is fixed to the projected portion further forward than a leading edge of the lens unit.

3. The imaging apparatus according to claim 1, wherein the hinge member is a two-axis hinge capable of rotating the display monitor by a second rotating shaft that forms an angle of 90 degrees with the first rotating shaft, and the display surface of the display monitor passes through a state in which the display surface faces rearward of the imaging apparatus and becomes a state facing downward of the imaging apparatus by rotating the display monitor around the second rotating shaft if the display monitor is drawn from the first state to the second state.

4. The imaging apparatus according to claim 3, wherein the hinge member is a two-axis hinge capable of rotating the display monitor by the second rotating shaft orthogonal to the first rotating shaft, and the second rotating shaft is set in a position offset from a center line in a short side direction of the display monitor.

5. The imaging apparatus according to claim 4, wherein the second rotating shaft is set in a position offset from the center line in the short side direction of the display monitor such that the center line in the short side direction of the display monitor is located in a position higher than the second rotating shaft if the display monitor is drawn from the first state to the second state, and is rotated around the second rotating shaft so as to turn the display surface to face rearward of the imaging apparatus.

6. The imaging apparatus according to claim 1, wherein a position of the first rotating shaft is set such that the first rotating shaft orthogonally intersects the center line of the display monitor in the short side direction in a state where the display monitor is stored in the pedestal portion.

* * * * *